(12) United States Patent
Serita

(10) Patent No.: US 6,566,790 B1
(45) Date of Patent: May 20, 2003

(54) DRIVING APPARATUS AND DRIVING METHOD OF PIEZOELECTRIC ACTUATOR

(75) Inventor: Yasuaki Serita, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/659,970

(22) Filed: Sep. 12, 2000

(30) Foreign Application Priority Data

Sep. 13, 1999 (JP) ............................................. 11-259165

(51) Int. Cl.[7] .............................. G02B 7/02; H01L 41/08
(52) U.S. Cl. ....................................................... 310/328
(58) Field of Search ................................. 310/328, 316, 310/317, 322, 311, 314, 323, 320, 259, 359; 359/824

(56) References Cited

U.S. PATENT DOCUMENTS

| | | | | |
|---|---|---|---|---|
| 4,767,959 A | * | 8/1988 | Sakakibara et al. | 310/317 |
| 5,225,941 A | * | 7/1993 | Saito et al. | 359/824 |
| 5,589,723 A | * | 12/1996 | Yoshida | 310/328 |
| 5,907,212 A | * | 5/1999 | Okada | 310/328 |
| 6,051,909 A | * | 4/2000 | Shinke | 310/316.01 |
| 6,147,434 A | * | 11/2000 | Nakano | 310/317 |
| 6,417,598 B2 | * | 7/2002 | Grehant | 310/316.01 |

FOREIGN PATENT DOCUMENTS

| | | | | |
|---|---|---|---|---|
| JP | 07-298656 A | | 11/1995 | |
| JP | 8-29655 | * | 2/1996 | ............ G02B/7/02 |
| JP | 8-114736 | * | 5/1996 | ............ G02B/7/02 |
| JP | 11-114494 A | | 4/1999 | |

* cited by examiner

Primary Examiner—Nestor Ramirez
Assistant Examiner—Karen Addison
(74) Attorney, Agent, or Firm—Sidley Austin Brown & Wood LLP

(57) ABSTRACT

An impact type piezoelectric actuator moves a driven member reciprocally by charging and discharging a piezoelectric device at different charging and discharging speed corresponding to moving direction. When a moving speed of the driven member is supposed to be slower than a predetermined threshold speed due to drop of voltage of a battery or drop of an ambient temperature, a controller drives the piezoelectric actuator in a manner to increase expansion and contraction of the piezoelectric device. Alternatively, when the moving speed of the driven member is supposed to be equal to or higher than the predetermined threshold speed, the controller drives the piezoelectric actuator in a manner to decrease the expansion and contraction of the piezoelectric device for saving the electric power consumption of the battery.

11 Claims, 11 Drawing Sheets

WAVE FORMS OF
DETECTION SIGNALS
V1 AND V2 OF
MAGNETIC SENSOR

OUTPUT SIGNAL Vo
OF COMPARATOR

DRIVING APPARATUS AND DRIVING METHOD OF PIEZOELECTRIC ACTUATOR

This application is based on patent application Hei.11-259165 filed in Japan, the contents of which are hereby incorporated by references.

BACKGROUND OF THE INVENTION

1. Field of the Invention

This invention relates to a driving apparatus and a driving method of an impact type piezoelectric actuator.

2. Description of the Related Art

In an impact type piezoelectric actuator, a driven member is movably connected to a rod shaped driving member in an axial direction thereof and a piezoelectric device is connected on an end of the driving member in a manner so that the polarization of the piezoelectric device coincides with the axial direction. For example, Publication Gazette of Japanese Patent Application Hei.7-298656 shows a conventional impact type piezoelectric actuator used for moving a taking lens of a camera., A basic configuration of the conventional impact type piezoelectric actuator is shown in FIG. 14. The piezoelectric actuator 100 comprises a rod shaped driving member 101, a driven member 102, a lamination type piezoelectric device 103 and a driving circuit 104. The driven member 102 is coupled with the driving member 101 by a predetermined friction force. When a force larger than the friction force is applied to the driven member 102, it can be moved in an axial direction of the driving member 101. An object to be moved such as a taking lens is connected to the driven member 102. The piezoelectric device 103 is connected on a base end 101b of the driving member 101 in a manner so that the polarization of the piezoelectric device 103 coincides with the axial direction of the driving member 101. A pair of electrodes 103a and 103b are provided on both ends of the piezoelectric device 103. The electrode 103b is grounded and the other electrode 103a is connected to the driving circuit 104.

The driving circuit 104 is configured by a forward driving circuit 105 for moving the driven member 102 toward a top end 101a of the driving member 101 (hereinafter, this direction is called "forward"), a backward driving circuit 106 for moving the driven member 102 toward the base end 101b of the driving member 101 (hereinafter, this direction is called "backward") and a controller 107 for controlling the forward driving circuit 105 and the backward driving circuit 106.

The forward driving circuit 105 is configured by a slow charger 105a and a quick discharger 105b. The backward driving circuit 106 is configured by a quick charger 106a and a slow discharger 106b. The slow charger 105a and the quick charger 106a respect apply a driving voltage Vp to the piezoelectric device 103 in the polarization direction (or charge the piezoelectric device 103 in the polarization direction) for expanding the piezoelectric device 103 in the polarization direction (or in the axial direction of the driving device 101). The quick discharger 105b and the slow discharger 106b respectively apply a potential to the piezoelectric device 103 in the opposite direction to the polarization or discharging the electric charge in the piezoelectric device 103 by grounding the electrode 103a for contracting the piezoelectric device 103.

The slow charger 105a is configured by a constant current circuit for controlling the charging speed by restricting the charging current. The slow charger 106b is configured by a constant current circuit for controlling the discharging speed by restricting the discharging current.

The controller 107 alternately switches the slow charger 105a and the quick discharger 105b in the forward driving operation. The controller 107 alternately switches the quick charger 106a and the slow discharger 106b in the backward driving operation.

When the slow charger 105a and the quick discharger 105b are alternately driven in the forward driving operation, the piezoelectric device 103 repeats the slow expansion and the quick contraction alternately. By such operation, the driving member 101 repeats the forward slow movement and the backward quick movement. When the quick charger 106a and the slow discharger 106b are alternately driven in the backward driving operation, the piezoelectric device 103 repeats the quick expansion and the slow contraction alternately. By such operation, the driving member 101 repeats the forward quick movement and the backward slow movement.

The friction force acting between the driving member 101 and the driven member 102 becomes smaller when the driving member 101 moves quickly, and it becomes larger when the driving member 101 moves slowly. Thus, the driven member 102 moves with the driving member 101 only when the driving member 101 moves slowly. Consequently, the driven member 102 moves forward relative to the driving member 101 in the forward driving operation, and the driven member 102 moves backward relative to the driving member 101 in the backward driving operation.

The impact type piezoelectric actuator is generally used for driving an optical system of a portable equipment such as a taking lens of a camera and a lens of a binoculars. It is preferable to make the driving circuit of the actuator compact and simple with regard to the downsizing and the lightening of the equipment. Since the electric power supply of the portable equipment is a dry battery, it is preferable to drive the driving circuit of the actuator by a voltage of the battery.

The voltage of the battery, however, is relatively lower, so that the quantity of the expansion and contraction of the piezoelectric device 103 becomes smaller when the piezoelectric device 103 is charged and discharged between the voltage Vp of the battery and the grounded voltage (0V). Consequently, the moving speed of the driven member 102 becomes slower. When the moving distance of the driven member 102 is relatively longer, the driving time period of the piezoelectric device 103 becomes longer, and the exhaustion of the battery becomes larger. Furthermore, when the voltage of the battery is dropped due to the exhaustion of the battery or the variation of the ambient temperature, the moving speed of the driven member 102 becomes much slower or the driven member 102 becomes immovable.

For solving the above-mentioned problem, it is proposed to apply a technique for increasing amplitude of output signals virtually double by using the BTL (Bridged Tied Load) connection into the driving circuit 104 of the piezoelectric actuator. The BTL connection is generally used in a car audio system for increasing output power of speaker. By applying the technique into the driving circuit 104 of the piezoelectric actuator, the voltages +Vp and −Vp are alternately applied to the piezoelectric device 103. The piezoelectric device 103 is repeatedly charged and discharged between the voltage +Vp and −Vp, so that the voltage of the driving signal of the piezoelectric device 103 becomes substantially double. The voltage of the electric power supply, however, is applied to the piezoelectric device 103 in the discharging time period in the opposite direction, so that the electric power consumption of the piezoelectric actuator becomes larger than the conventional driving method. When the battery is used as the electric power supply, the exhaustion of the battery becomes faster.

SUMMARY OF THE INVENTION

An object of this invention is to provide a driving apparatus for the piezoelectric actuator which can effectively be driven by a battery and can save the electric power consumption without causing the upsizing of the circuit and the reduction of the driving efficiency.

A driving apparatus of impact type piezoelectric actuator in accordance with an aspect of this invention comprises a controller for switching a first driving mode and a second driving mode of the piezoelectric actuator corresponding to a condition with respect to a moving speed of a driven member driven by the piezoelectric actuator.

When the moving speed of the driven member is supposed to be slower than a predetermined threshold speed, the piezoelectric actuator is driven in the first driving mode so that a driving voltage of an electric power supply is applied to a piezoelectric device alternately in positive direction and negative direction by switching a polarity of the driving voltage. Thus, the piezoelectric device repeats expansion and contraction, and a driven member can be moved at a speed faster than the supposed moving speed in a predetermined direction. The moving speed of the driven member can be made faster.

Alternatively, when the moving speed of the driven member is supposed to be equal to or faster than a predetermined threshold speed, the piezoelectric actuator is driven in the second driving mode so that the piezoelectric device is alternately applied the driving voltage and grounded. Thus, the piezoelectric device repeats expansion and contraction, and the driven member can be moved at a speed slower than the supposed moving speed in a predetermined direction and electric power consumption of the battery can be saved.

The condition with respect to the moving speed of the driven member is, for example, at least one of a voltage of a battery, an ambient temperature of an equipment using the piezoelectric actuator, an actual moving speed of the driven member, and so on.

DETAILED DESCRIPTION OF THE EMBODIMENT

Figure 1:
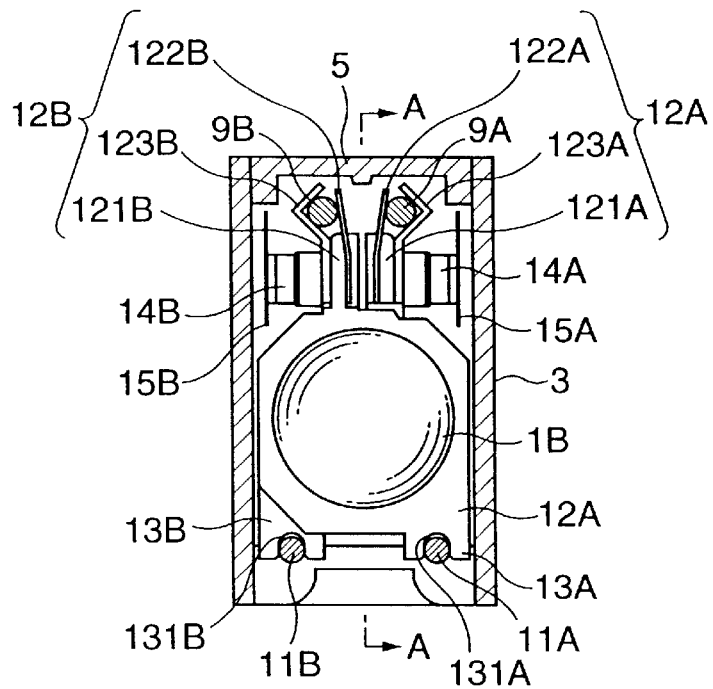
FIG. 1 is a sectional front view for showing an internal configuration of a lens barrel of a digital camera using an impact type piezoelectric actuator in accordance with an embodiment of this invention.
Figure 2:
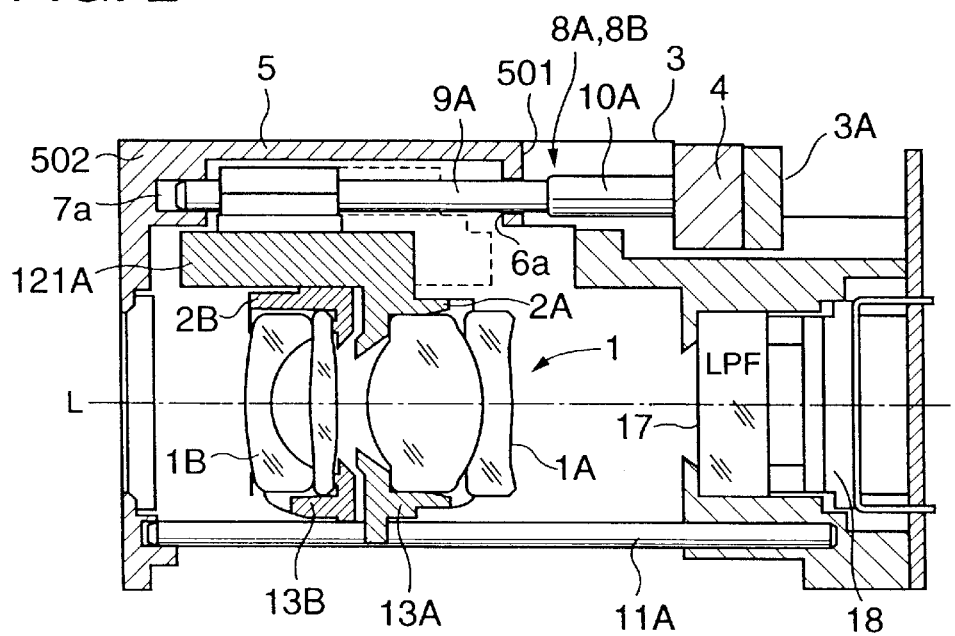
FIG. 2 is A—A cross-sectional view of the digital camera shown in FIG. 1.

An embodiment of this invention is described. Detailed internal configuration of a lens barrel of a digital camera, which is an example of an equipment using an impact type piezoelectric actuator, is shown in FIGS. 1 and 2.

A taking lens 1 is a zoom lens having two main components of a rear component 1A and a front component 1B. The rear component 1A and the front component 1B are independently movable in a direction parallel to an optical axis L of the taking lens 1 by independently driving two mechanisms respectively using an impact type piezoelectric actuator. A focal length of the taking lens 1 is varied by changing positions the rear component 1A and the front component 1B. The rear component 1A is held by a rear lens frame 2A. The front component 1B is held by a front lens frame 2B. The positions of the rear component 1A and the front component 1B are respectively changed by moving the lens frames 2A and 2B by a pair of impact type piezoelectric actuators 8A and 8B.

An optical low-pass filter 17 is disposed on the optical axis L and an image pickup device 18 such as a single color CCD (Charge Coupled Device) area sensor is disposed behind the low-pass filter 17. An optical image of an object is focused on an image pickup surface of the image pickup device 18 through the low-pass filter 17 by the taking lens 1. For adjusting the position of the image, the front component 1B of the taking lens 1 is moved along the optical axis L.

The piezoelectric actuators 8A and 8B, which are respectively configured by driving members 9A, 9B and piezoelectric actuators 10A, 10B, are provided in an upper portion of a lens barrel 3. The driving members 9A and 9B are provided in parallel with the optical axis L with a predetermined distance. A pair of guide shafts 11A and 11B are provided in parallel with the optical axis L with a predetermined distance in a lower portion of the lens barrel 3.

An upper end of the rear lens frame 2A is movably engaged with the driving member 9A of the piezoelectric actuator 8A. An upper end of the front lens frame 2B is movably engaged with the driving member 9B of the piezoelectric actuator 8B. Base ends of the driving members 9A and 9B are respectively fixed on an end of piezoelectric devices 10A and 10B (the piezoelectric device 10B is not illustrated). A lower end of the rear lens frame 2A is movably engaged with the guide shaft 11A. A lower end of the front lens frame 2B is movably engaged with the guide shaft 11B. The guide shafts 11A and 11B serve as rotation stoppers so as not to rotate the lens frames 2A and 2B around the driving members 9A and 9B when the lens frames 2A and 2B are moved by the piezoelectric actuators 8A and 8B.

Base ends of the piezoelectric devices 10A and 10B are fixed on a fixing base 4 provided on an upper portion of a base member 3A of the lens barrel 3. A frame 5 is formed from a middle portion toward a front end 3B of the lens barrel 3. The frame 5 has a channel shaped section in a direction perpendicular to the optical axis L. The frame 5 has a pair of bearing holes 6a and 6b on a rear wall 501 and a pair of deep bearing holes 7a and 7b respectively facing the bearing holes 6a and 6b on a front wall 502. In FIG. 2, the bearing holes 6b and 7b are not shown. The driving member 9A is movably borne in a direction parallel to the optical axis L by the bearing holes 6a and 7a. The driving member 9B is movably borne in a direction parallel to the optical axis L by the bearing holes 6b and 7b. Rear ends of the driving members 9A and 9B are connected to free ends of the piezoelectric devices 10A and 10B.

The piezoelectric devices 10A and 10B are respectively of a lamination type. The lamination type piezoelectric device is formed by piling up of a plurality of ceramic thin plates having a predetermined thickness and electrodes alternately disposed. The ceramic thin plates are piled in a manner so that polarization direction of the ceramic thin plates alternately disposed becomes the same. Since a positive voltage and a negative voltage are applied between each adjoining electrodes, each ceramic thin plate expands and contracts in the same direction. As a result, a large expansion and contraction can be obtained by whole of piezoelectric device.

The piezoelectric actuator 8A is used for moving the rear lens frame 2A holding the rear component 1A of the taking lens 1, and the piezoelectric actuator 8B is used for moving the front lens frame 2B holding the front component 1B of the taking lens 1. The lens holders 2A and 2B respectively correspond to driven members to be moved by the piezoelectric actuators 8A and 8B. In the following description, the lens holder 2A or 2B will be called "driven member" when the description refers to the driving control of the piezoelectric actuator 8A or 8B.

A holder 12A for hanging the rear lens holder 2A on the driving member 9A is formed substantially at an upper center portion of the rear lens frame 2A. A guide 13A for restricting the rotation of the rear lens frame 2A is formed at lower right portion of the rear lens frame 2A. The guide 13A has a guide groove 131A engaged with the guide shaft 11A on the bottom thereof. Thus, the rear lens holder 2A can slidably move in parallel with the optical axis L along the guide shaft 11A.

Similarly, a holder 12B for hanging the front lens holder 2B on the driving member 9B is formed substantially at an upper center portion of the front lens frame 2B. A guide 13B for restricting the rotation of the front lens frame 2B is formed at lower left portion of the front lens frame 2B. The guide 13B has a guide groove 131B engaged with the guide shaft 11B on the bottom thereof. Thus, the front lens holder 2B can slidably move in parallel with the optical axis L along the guide shaft 11B.

The holder 12A is configured by a protrusion 121A formed on an upper face of the rear lens frame 2A and a pair of nipping plates 122A and 123A fixed on both side of the protrusion 121A and made of an elastic member such as a phosphor bronze plate. As can be seen from FIG. 1, the nipping plate 122A is a little bent toward the driving member 9A and the nipping plate 123A is largely bent as herringbone shape for nipping the driving member 9A between the nipping plates 122A and 123A. By such a configuration, the rear lens holder 2A is slidably engaged with the driving member 9A. A nipping force of the nipping plates 122A and 123A for nipping the siding member 9A is adjusted in a manner so that friction forces generated between the driving member 9A and the nipping plates 122A and 123A in the forward driving are different from those in the backward driving by the expansion and contraction of the piezoelectric device 10A so as to move the rear lens frame 2A relative to the piezoelectric device 10A.

In other words, the piezoelectric device 10A is driven alternately for expanding quickly and contracting slowly or for expanding slowly and contracting quickly, so that the driving member 9A repeats quick forward movement and slow backward movement or slow forward movement and quick backward movement. When the driving member 9 moves quickly, the friction forces between the driving member 9A and the nipping plates 122A and 123A become smaller. And when the driving member 9A moves slowly, the friction forces between the driving member 9A and the nipping plates 122A and 123A become larger.

Thus, when the driving member 9A quickly moves forward or backward, only the driving member 9A moves and the rear lens frame 2A stays at the position by inertia thereof. Alternatively, when the driving member 9A slowly moves forward or backward, the rear lens frame 2A moves with the driving member 9A. By such operations, the rear component 1A held on the rear lens frame 2A moves backward or forward relative to the piezoelectric device 10A.

Similarly, the holder 12B is configured by a protrusion 121B formed on an upper face of the front lens frame 2B and a pair of nipping plates 122B and 123B fixed on both side of the protrusion 121B and made of an elastic member such as a phosphor bronze plate. The same rules as mentioned above can be applied to the relation between the driving member 9B and the nipping plates 122B and 123B.

As can be seen from FIG. 1, a magnetic sensor 14A is provided on an outer face of the protrusion 121A of the holder 12A. A magnetic scale 15A is provided on an inner face of the right side wall of the frame 5 for facing a trail of the magnetic sensor 14A. The magnetic sensor 14A, the magnetic scale 15A and a signal processing circuit (corresponding to a signal processing circuit 16 in FIG. 3) constitutes a position sensor for sensing a position of the rear component 1A of the taking lens 1 in the lens barrel 3.

Similarly, a magnetic sensor 14B is provided on an outer face of the protrusion 121B of the holder 12B. A magnetic scale 15B is provided on an inner face of the left side wall of the frame 5 for facing a trail of the magnetic sensor 14B. The magnetic sensor 14B, the magnetic scale 15B and a signal processing circuit (corresponding to a signal processing circuit 16 in FIG. 3) constitutes a position sensor for sensing a position of the front component 1B of the taking lens 1 in the lens barrel 3.

The magnetic scales 15A and 15B are respectively a band scale on which a plurality of the N-poles and the S-poles are alternately disposed at a pitch $\lambda$ (see FIG. 3) and provided in parallel with the optical axis L. The magnetic sensors 14A and 14B are respectively configured by a bridge circuit of four magneto-resistive devices MRa, MRb, MRc and MRd (see FIG. 3). A driving voltage $V_{DD}$ from an electric power supply is applied between a connection point of the devices MRa and MRb and a connection point of the devices MRc and MRd. A detection signal V1 is outputted from a connection point of the devices MRa and MRc. A detection signal V2 is outputted from a connection point of the devices MRb and MRd.

Figure 3:
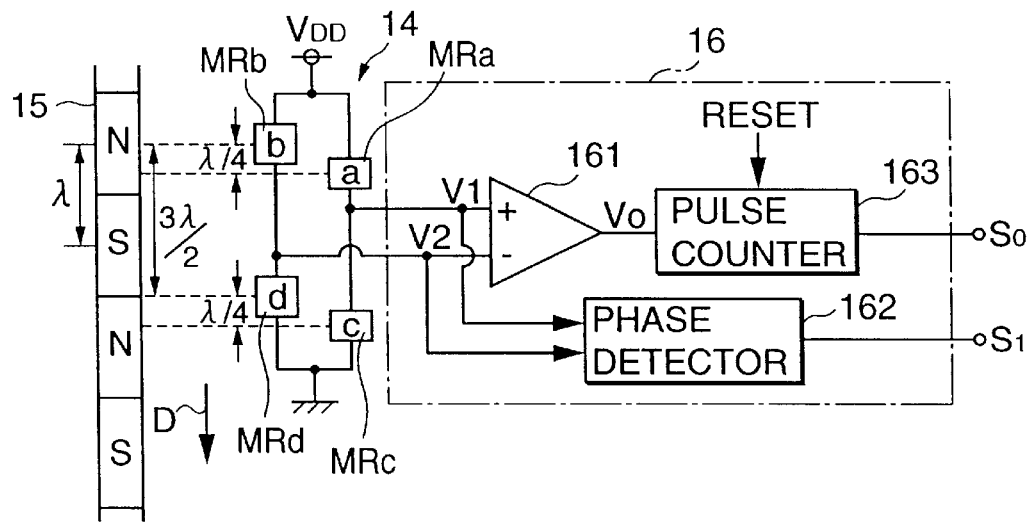
FIG. 3 is a block diagram for showing details of a position sensor and a signal processing circuit thereof in the embodiment.

A sensing position of the device MRc is distant by a distance of $3\lambda/2$ from a sensing position of the device MRa in a moving direction shown by arrow "D" in FIG. 3. When the magneto-resistive device MRb faces the N-pole on the magnetic scale 15, a magnetic field applied to the device MRb from the magnetic scale 15 becomes the largest. At the same time, the magneto-resistive device MRd faces the boundary of the N-pole and the S-pole, so that the magnetic field applied to the device MRd from the magnetic scale 15 becomes the smallest. Similarly, when the magnetic field applied to the device MRa from the magnetic scale 15 becomes the largest, the magnetic field applied to the device MRc from the magnetic scale 15 becomes the smallest.

Furthermore, the sensing position of the device MRa is distant by a distance of $\lambda/4$ from the sensing position of the device MRb in the moving direction shown by arrow "D". Similarly, the sensing position of the device MRc is distant by a distance of $\lambda/4$ from the sensing position of the device MRd in the moving direction shown by arrow "D".

When a magnetic field is applied to a magneto-resistive device, the electric resistance of the magneto-resistive device becomes smaller corresponding to the intensity of the magnetic field. The values of the electric resistance of the magneto-resistive devices MRa and MRc are designated by symbols Ra and Rc. The detection signal V1 is outputted as a voltage $V_{DD} \cdot Rc/(Ra+Rc)$ which is the product of the driving voltage $V_{DD}$ by $Rc/(Ra+Rc)$. Similarly, the values of the electric resistance of the magneto-resistive devices MRb and MRd are designated by symbols Rb and Rd. The detection signal V2 is outputted as a voltage $V_{DD} \cdot Rd/(Rb+Rd)$ which is the product of the driving voltage $V_{DD}$ by $Rd/(Rb+Rd)$.

Since a plurality of N-poles and S-poles are alternately arranged in the magnetic scale 15, a magnetic field having a sine wave distribution of the intensity is formed along the surface of the magnetic scale 15 in the lengthwise direction thereof. When the magnetic sensor 14 moves along the magnetic scale 15, the detection signals V1 and V2 respectively having the sine waveforms are outputted.

In FIG. 3, the signal processing circuit 16 comprises a comparator 161, a phase detector 162 and a pulse counter 163. The detection signals V1 and V2 of the magnetic sensor 14 are inputted not only to the phase detector 162 but also the noninverting input terminal and inverting input terminal of the comparator 161.

Figure 4:
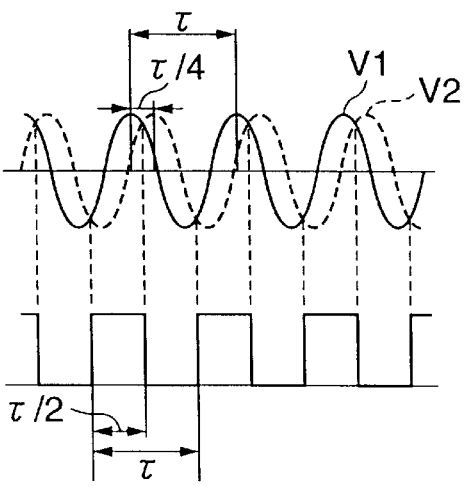
FIG. 4 is a timing chart for showing waveforms of output signals of a magnetic sensor and an output signal of a comparator in the embodiment.

When the magnetic sensor 14 moves in the direction shown by arrow "D", facing the magnetic scale 15, the detection signals V1 and V2 having the waveforms shown in FIG. 4 are outputted from the magnetic sensor 14. A sensing position of a series connection of the magneto-resistive devices MRa and MRc is distant by $\lambda/4$ from a sensing position of a series connection of the magneto-resistive devices MRb and MRd, so that the phase the detection signal V2 is behind by $\lambda/4$ from the phase of the detection signal V1. Alternatively, when the magnetic sensor 14 moves in the direction opposite to the arrow "D", the phase the detection signal V2 is ahead by $\lambda/4$ from the phase of the detection signal V1.

The comparator 161 outputs a high level signal when the noninverting input signal is equal to or larger than the inverting input signal. When the detection signal V1 is equal to or larger than the detection signal V2, an output signal Vo of the comparator 161 becomes high level. When the detection signal V1 is smaller than the detection signal V2, the output signal Vo of the comparator 161 becomes low level. In other words, the waveform of the output signal Vo of the comparator 161 becomes pulse signals having a pulse width of $\tau/2$ and a duty ratio of 50%. The frequency $\tau$ of the pulse signals is designated by $\tau=\lambda/v$, when the moving speed of the lens frame (driven member) 2A or 2B is shown by a symbol "v".

The pulse counter 163 counts a number "N" of the pulse of the output signal Vo of the comparator 161. The phase detector 162 detects whether the phase of the detection signal V1 is ahead or behind than that of the detection signal V2. When the phase of the detection signal V2 is behind than that of the detection signal V1, an output signal Si of the phase detector 162 becomes high level. Alternatively, when the phase of the detection signal V2 is ahead than that of the detection signal V1, an output signal S1 of the phase detector 162 becomes low level.

When the digital camera is started up, the rear component 1A and the front component 1B of the taking lens 1 are moved at initial positions When the front component 1B of the taking lens 1 is moved, the present position of the front component 1B with respect to the initial position can be detected by using a displacement and the moving direction of the front component 1B. The displacement of the front component 1B is calculated by the product of pulse number "N" corresponding to an output signal S0 of the pulse counter 163 and the pitch $\lambda$ of the N-poles and the S-poles of the magnetic scale 15. The moving direction of the front component 1B can be judged by the output signal S1 of the phase detector 162. Similarly, the present position of the rear component 1A with respect to the initial position can be detected by using the output signal S0 of the pulse counter 163 and the output signal S1 of the phase detector 162.

Figure 5:
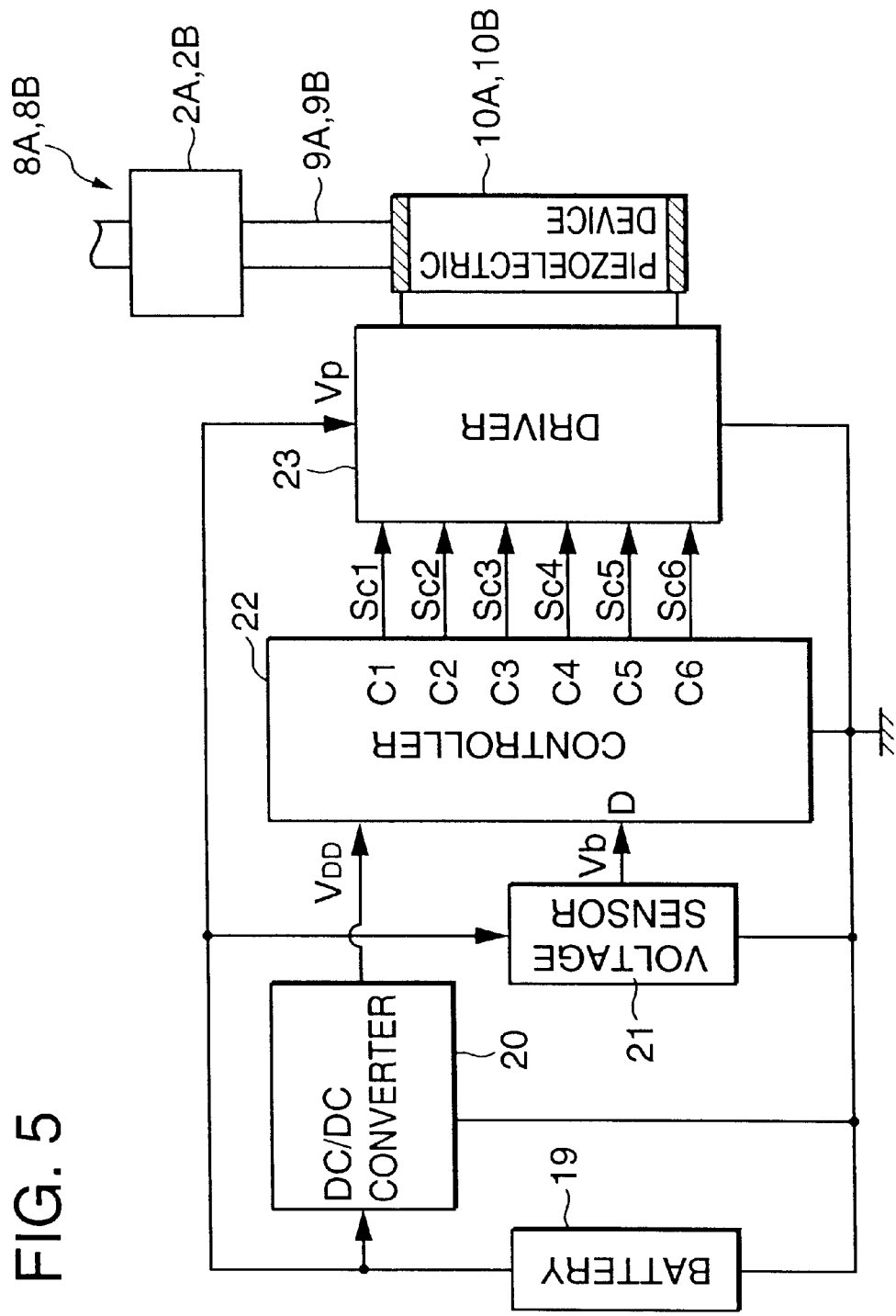
FIG. 5 is a block diagram for showing a basic configuration of an impact type piezoelectric actuator and a driving circuit thereof in the embodiment.
Figure 6:
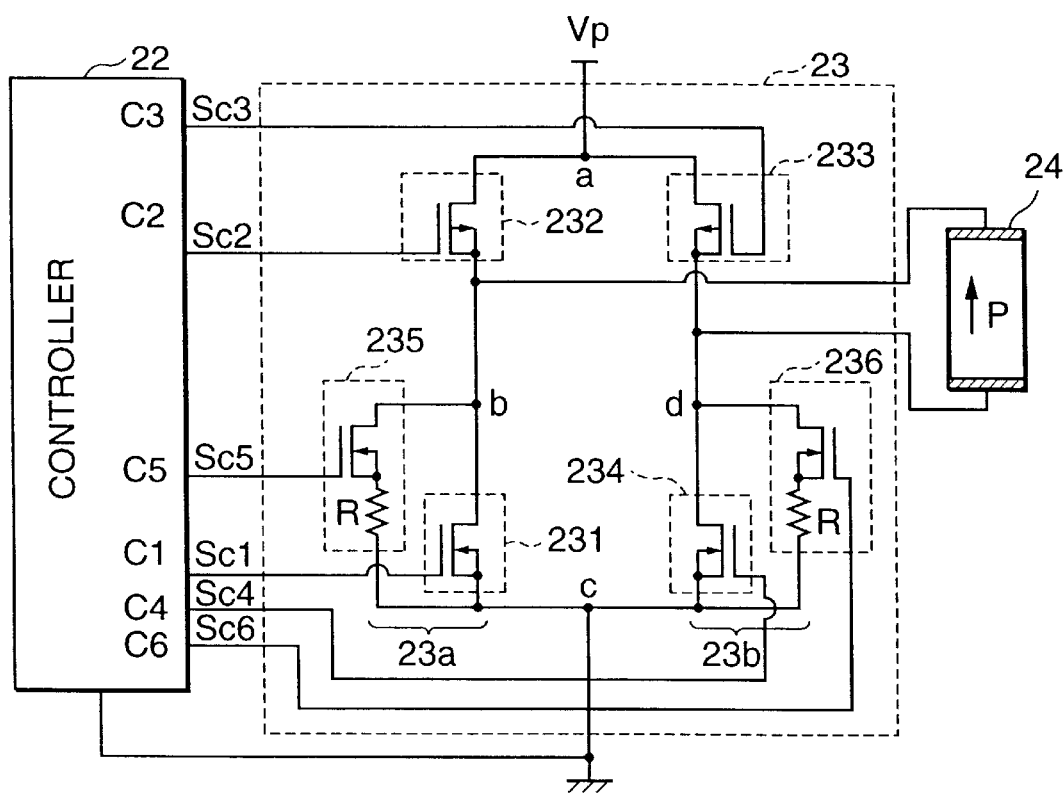
FIG. 6 is a circuit diagram of a driver in the driving circuit shown in FIG. 5.

A block diagram of driving circuit including the impact type piezoelectric actuators 8A and 8B in this embodiment is shown in FIG. 5. Detailed configuration of a driver 23 in the block diagram is shown in FIG. 6.

In FIG. 5, a battery 19 such as a primary battery or a secondary battery serving as a main electric power supply in the digital camera supplies a driving power of the impact type piezoelectric actuators 8A and 8B. A DC/DC converter 20 increases the voltage of the battery 19 for generating the driving voltage $V_{DD}$ of a controller 22 and the magnetic sensor 14 (not shown in FIG. 5). A voltage sensor 21 detects the voltage Vp of the battery 19. The voltage sensor 21 is, for example, a series circuit of two resistors, and a divided reference voltage Vb of the voltage Vp of the battery 19 divided by the resistors is inputted to a D-terminal of the controller 22.

The controller 22 controls the driver 23 for expanding and contracting the piezoelectric devices 10A and 10B. The controller 22 is configured by a logic circuit, a microcomputer and so on. The driver 23 is configured by a bridge circuit as shown in FIG. 6. When the voltage Vp of the battery 19 is applied to the piezoelectric device 10A or 10B in the same direction as the polarization of the piezoelectric device 10A or 10B, the driving voltage of the piezoelectric device 10A or 10B is designated by +Vp. When the voltage Vp of the battery 19 is applied to the piezoelectric device 10A or 10B in the direction opposite to the polarization, the driving voltage of the piezoelectric device 10A or 10B is designated by −Vp. The driver 23 can alternately apply the voltages +Vp (v) and −Vp (v) to the piezoelectric device 10A or 10B. Hereinafter, this driving mode is called "first driving mode". Furthermore, the driver 23 can alternately apply the voltages +Vp (v) and 0 (v) (grounded) to the piezoelectric device 10A or 10B. Hereinafter, this driving mode is called "second driving mode".

The controller 22 can switch the first driving mode and the second driving mode of the driving of the piezoelectric device 10A or 10B by the driver 23 for reducing the consuming of the battery 19 as smaller as possible based on the value of the reference voltage Vb of the voltage sensor 21. Details of the switching of the driving modes will be described below.

As can be seen from FIG. 6, the driver 23 is configured as a bridge circuit of a parallel circuit 23a of a first circuit 231 and a fifth circuit 235, a second circuit 232, a third circuit 233 and a parallel circuit 23b of a fourth circuit 234 and a sixth circuit 236. The first circuit 231 and the fourth circuit 234 are respectively configured by an N-channel MOS-FET (Metal Oxide Semiconductor Field Effect Transistors). The second circuit 232 and the third circuit 233 are respectively configured by a P-channel MOS-FET. The fifth circuit 235 and the sixth circuit 236 are respectively configured as a series circuit by a resistor R and an N-channel MOS-FET.

The MOS-FETs serve as switching circuits for switching the driving mode of the driver 23 between the first driving mode and the second driving mode. Furthermore, the MOS-FETs serve as switching circuits for switching the moving direction of the driven member (the rear lens frame 2A and the front lens frame 2B) between the forward direction and the backward direction. The resistors R of the fifth circuit 235 and the sixth circuit 236 restrict a charging current to and a discharging current from the piezoelectric device 10A or 10B.

Gate terminals of the MOS-FETs of the first to sixth circuits 231 to 236 are respectively connected to control terminals C1 to C6 of the controller 22 so as to be inputted driving control signals Sc1 to Sc6.

The battery 19 is connected between a connection point "a" of the second circuit 232 and the third circuit 233 and a connection point "c" of the parallel circuits 23a and 23b in a manner so that the potential at the connection point "a" becomes positive. The piezoelectric device 10A or 10B is connected between a connection point "b" of the second circuit 232 and the parallel circuit 23a and a connection point "d" of the third circuit 233 and the parallel circuit 23d in a manner so that the connection point "b" is connected to a positive direction of the polarization. Alternatively it is possible to connect the piezoelectric device 10A or 10B in a manner so that the connection point "d" is connected to a positive direction of the polarization. In the example shown in FIG. 6, the MOS-FETs are used as the switching devices. It, however, is possible to use bipolar transistors, junction type FETs (Field Effect Transistors), or GTOs (Gate Turn-off Thyristors) can be used as the switching devices.

By controlling the switching on and off of the FETs in the first circuit 231 to the sixth circuit 236, it is possible to change the function of the driver 23. When combinations of the circuits serially connected to the piezoelectric device 10A or 10B are designated by $K_{ij}$ (the symbol "i" designates the i-th circuit, and the symbol "j" designates the j-th circuit), a circuit $K_{2,6}$ (the second circuit 232+the sixth circuit 236), a circuit $K_{3,1}$ (the third circuit 233+the first circuit 231), a circuit $K_{2,4}$ (the second circuit 232+the fourth circuit 234) and a circuit $K_{3,5}$ (the third circuit 233+the fifth circuit 235) configure a first driving circuit. Similarly, a circuit $K_{2,6}$, a circuit $K_{4,1}$ (the fourth circuit 234+the first circuit 231) and a circuit $K_{3,5}$ configure the second driving circuit.

In the first driving mode, the circuits $K_{2,6}$ and $K_{3,1}$ configure a forward driving circuit for driving the driven member 2A or 2B forward. The circuits $K_{2,4}$ and $K_{3,5}$ configure a backward driving circuit for driving the driven member 2A or 2B backward.

The circuit $K_{2,6}$ quickly discharges the electric charge stored in the direction opposite to the polarization of the piezoelectric device 10A or 10B, and slowly charges the piezoelectric device. 10A or 10B in the polarization direction. Hereinafter, the circuit $K_{2,6}$ is called "slow charging circuit in the positive direction". The circuit $K_{3,1}$ quickly discharges the electric charge stored in the polarization of the piezoelectric device 10A or 10B, and quickly charges the piezoelectric device 10A or 10B in the direction opposite to the polarization direction. Hereinafter, the circuit $K_{3,1}$ is called "quick charging circuit in the negative direction".

The circuit $K_{2,4}$ quickly discharges the electric charge stored in the direction opposite to the polarization of the piezoelectric device 10A or 10B, and quickly charges the piezoelectric device 10A or 10B in the polarization direction. Hereinafter, the circuit $K_{2,4}$ is called "quick charging circuit in the positive direction". The circuit $K_{3,5}$ quickly discharges the electric charge stored in the polarization direction of the piezoelectric device 10A or 10B, and slowly charges the piezoelectric device 10A or 10B in the direction opposite to the polarization direction. Hereinafter, the circuit $K_{3,5}$ is called "slow charging circuit in the negative direction".

In the second driving mode, the circuits $K_{2,6}$ and $K_{4,1}$ configure a forward driving circuit for driving the rear lens frame 2A or the front lens frame 2B forward. The circuits $K_{2,4}$ and $K_{4,1}$ configure a backward driving circuit for driving the rear lens frame 2A or the front lens frame 2B backward The circuit $K_{2,6}$ slowly charges the electric charge stored in the polarization direction of the piezoelectric device 10A or 10B. Hereinafter, the circuit $K_{2,6}$ is called "slow charging circuit in the positive direction". The circuit $K_{3,5}$ slowly charges the piezoelectric device 10A or 10B in the direction opposite to the polarization direction of the piezoelectric device 10A or 10B. Hereinafter, the circuit $K_{3,5}$ is called "slow charging circuit in the negative direction". The circuit $K_{4,1}$ quickly discharges the electric charge stored in the direction opposite to the polarization of the piezoelectric device 10A or 10B.

The above-mentioned configurations of the driving circuits in the first and second driving modes are pigeonholed in the following table 1.

TABLE 1

| FIRST DRIVING MODE | FORWARD DRIVING CIRCUIT | SLOW CHARGING CIRCUIT IN POSITIVE DIRECTION $K_{2,6}$ | SECOND CIRCUIT 232 + SIXTH CIRCUIT 236 |
|---|---|---|---|
| | | QUICK CHARGING CIRCUIT IN NEGATIVE DIRECTION $K_{3,1}$ | THIRD CIRCUIT 233 + FIRST CIRCUIT 231 |
| | BACKWARD DRIVING CIRCUIT | QUICK CHARGING CIRCUIT IN POSITIVE DIRECTION $K_{2,4}$ | SECOND CIRCUIT 232 + FOURTH CIRCUIT 234 |
| | | SLOW CHARGING CIRCUIT IN NEGATIVE DIRECTION $K_{3,5}$ | THIRD CIRCUIT 233 + FIFTH CIRCUIT 235 |

TABLE 1-continued

| | | | |
|---|---|---|---|
| SECOND DRIVING MODE | FORWARD DRIVING CIRCUIT | SLOW CHARGING CIRCUIT IN POSITIVE DIRECTION $K_{2,6}$ | SECOND CIRCUIT 232 + SIXTH CIRCUIT 236 |
| | | QUICK DISCHARGING CIRCUIT $K_{4,1}$ | FOURTH CIRCUIT 234 + FIRST CIRCUIT 231 |
| | BACKWARD DRIVING CIRCUIT | SLOW CHARGING CIRCUIT IN NEGATIVE DIRECTION $K_{3,5}$ | THIRD CIRCUIT 233 + FIFTH CIRCUIT 235 |
| | | QUICK DISCHARGING CIRCUIT $K_{4,1}$ | FOURTH CIRCUIT 234 + FIRST CIRCUIT 231 |

Figure 7:
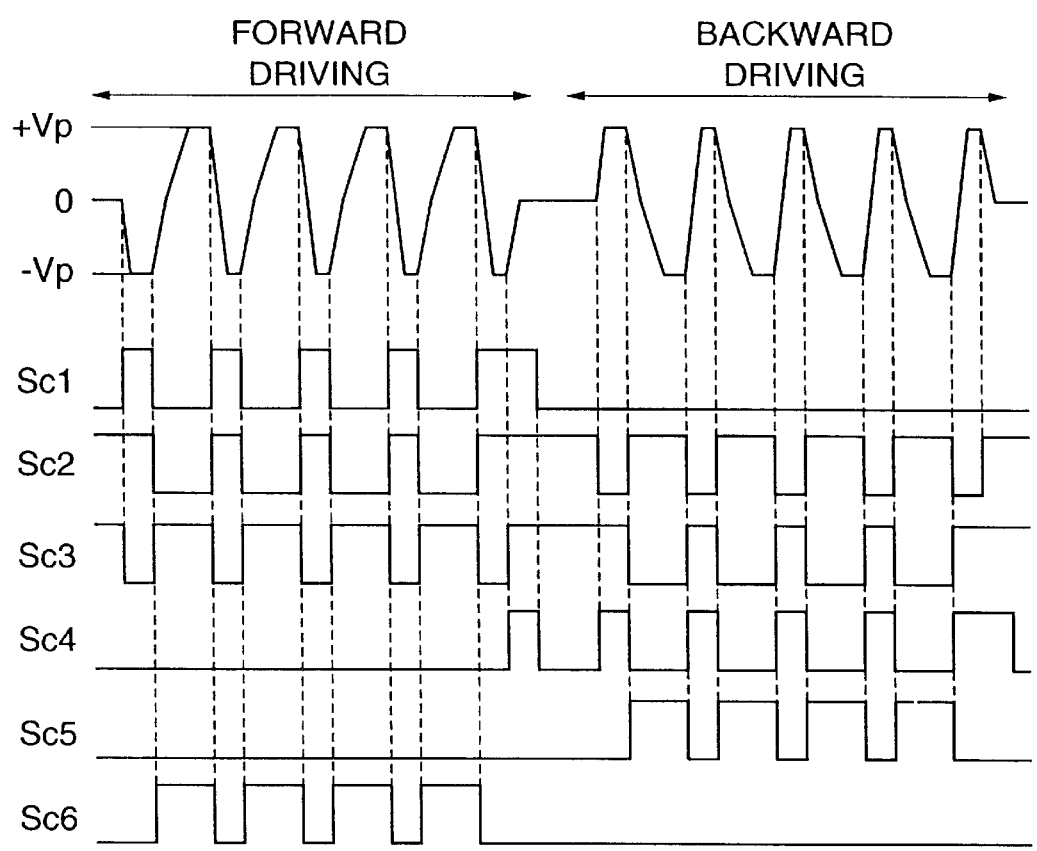
FIG. 7 is a timing chart for showing waveforms of driving control signals and charge-discharge voltage of a piezoelectric device in a first driving mode in the embodiment.

FIG. 7 shows waveforms of the driving control signals and variation of the potential of the piezoelectric device owing to the charge and discharge of the electric charge when the driver 23 is driven in the first driving mode.

As can be seen from table 1, the fourth circuit 234 and the fifth circuit 235 do not constitute the forward driving circuit in the first driving mode. Thus, as shown in FIG. 7, the low level driving control signals Sc4 and Sc5 are outputted from the control terminals C4 and C5 of the controller 22, so that the FETs of the fourth circuit 234 and the fifth circuit 235 are switched off. Equivalently, the first circuit 231, the second circuit 232, the third circuit 233 and the sixth circuit 236 configure a bridge circuit.

The driving control signals Sc1 and Sc2 are outputted from control terminals C1 and C2 of the controller 22. The phase of the driving control signal Sc1 is the same as that of the driving control signal Sc2. The driving control signals Sc3 and Sc6 are outputted from control terminals C3 and C6 of the controller 22. The phase of the driving control signal Sc3 is the same as that of the driving control signal Sc6. The phase of the driving control signal Sc1 is opposite to that of the driving control signal Sc3. The phase of the driving control signal Sc2 is opposite to that of the driving control signal Sc6. By the driving control signals Sc1 to Sc6, the slow charging circuit in positive direction $K_{2,6}$ (which is configured by the second circuit 232 and the sixth circuit 236) and the quick charging circuit in negative direction $K_{3,1}$ (which is configured by the third circuit 233 and the first circuit 231) are alternately connected to the piezoelectric device 10A or 10B, so that the piezoelectric device 10A or 10B is alternately charged slowly in the negative direction (or slowly expanded) and charged quickly in the positive direction (or quickly contracted).

In the slow charge in the negative direction, the voltage Vp of the battery 19 is applied to the piezoelectric device 10A or 10B through the resistor R. The voltage Vs between the terminals of the piezoelectric device 10A or 10B exponentially varies from −Vp to +Vp (V) with a time constant defined by a resistance of the resistor R and a capacitance C of the piezoelectric device 10A or 10B. On the other hand, in the quick charge in the positive direction, the voltage Vp of the battery is directly applied to the piezoelectric device 10A or 10B. The voltage Vs between the terminals of the piezoelectric device 10A or 10B linearly varies from +Vp to −Vp (V). Therefore, the piezoelectric device 10A or 10B repeats the slow expansion and quick contraction, alternately. By such the operation of the piezoelectric device 10A or 10B, the driving member 9A or 9B reciprocally moves with different speeds corresponding to the moving directions, so that the driven member 2A or 2B are moved forward.

Similarly, as can be seen from table 1, the first circuit 231 and the sixth circuit 236 do not constitute the backward driving circuit in the first driving mode. Thus, as shown in FIG. 7, the low level driving control signals Sc1 and Sc6 are outputted from the control terminals C1 and C6 of the controller 22, so that the FETs of the first circuit 231 and the sixth circuit 236 are switched off. Equivalently, the second circuit 232, the third circuit 233, the fourth circuit 234 and the fifth circuit 235 configure a bridge circuit.

The driving control signals Sc2 and Sc3 are outputted from the control terminals C2 and C3 of the controller 22. The phase of the driving control signal Sc2 is opposite to that of the driving control signal Sc3. The driving control signals Sc4 and Sc5 are outputted from the control terminals C4 and C5 of the controller 22. The phase of the driving control signal Sc4 is opposite to that of the driving control signal Sc5. The phase of the driving control signal Sc2 is the same as that of the driving control signal Sc5. The phase of the driving control signal Sc3 is the same as that of the driving control signal Sc4. By the driving control signals Sc1 to Sc6, the quick charging circuit in positive direction $K_{2,4}$ (which is configured by the second circuit 232 and the fourth circuit 234) and the slow charging circuit in negative direction $K_{3,5}$ (which is configured by the third circuit 233 and the fifth circuit 235) are alternately connected to the piezoelectric device 10A or 10B, so that the piezoelectric device 10A or 10B is alternately charged quickly in the positive direction (or quickly expanded) and charged slowly in the negative direction (or slowly contracted).

In the quick charge in the positive direction, the voltage Vp of the battery 19 is directly applied to the piezoelectric device 10A or 10B. The voltage Vs between the terminals of the piezoelectric device 10A or 10B linearly varies from −Vp to +Vp (V). On the other hand, in the slow charge in the negative direction, the voltage Vp of the battery 19 is applied to the piezoelectric device 10A or 10B through the resistor R. The voltage Vs between the terminals of the piezoelectric device 10A or 10B exponentially varies from +Vp to −Vp (V) with the time constant defined by the resistance of the resistor R and the capacitance C of the piezoelectric device 10A or 10B. Therefore, the piezoelectric device 10A or 10B repeats the slow expansion and quick contraction, alternately. By such operation of the piezoelectric device 10A or 10B, the driving member 9A or 9B reciprocally moves with different speeds corresponding to the moving directions, so that the driven member 2A or 2B is moved backward.

Figure 8:
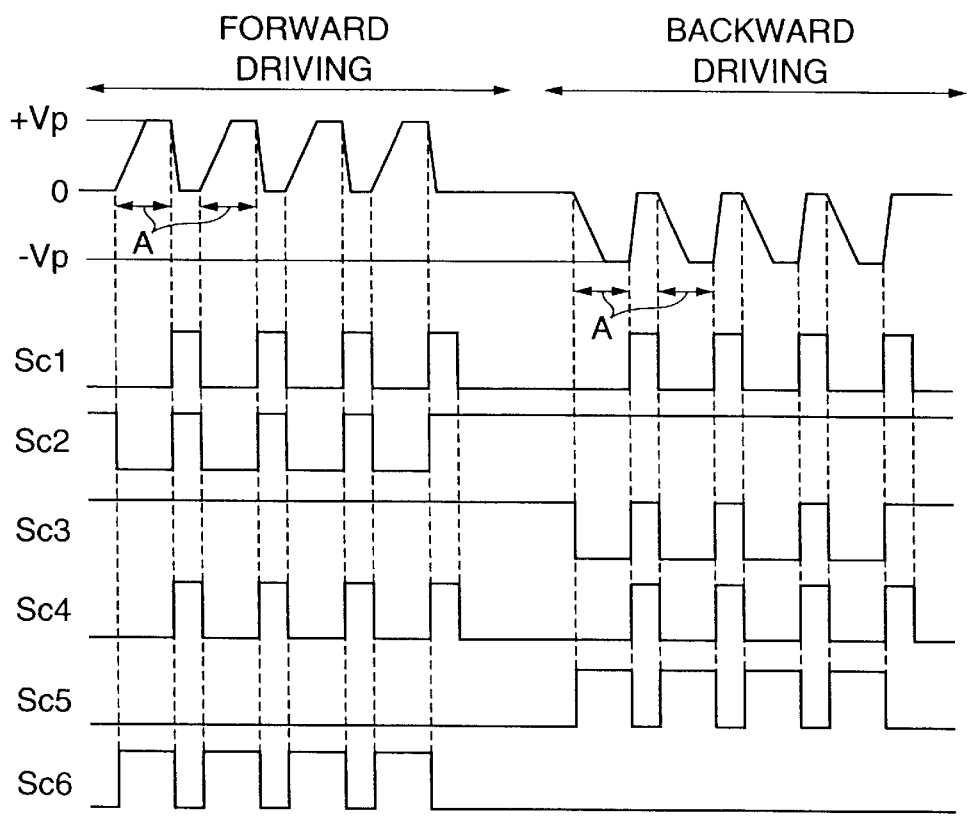
FIG. 8 is a timing chart for showing waveforms of driving control signals and charge-discharge voltage of a piezoelectric device in a second driving mode in the embodiment.

FIG. 8 shows waveforms of the driving control signals and variation of the potential of the piezoelectric device owing to the charge and discharge of the electric charge when the driver 23 is driven in the second driving mode.

As can be seen from table 1, the third circuit 233 and the fifth circuit 235 do not constitute the forward driving circuit in the second driving mode. Thus, as shown in FIG. 8, the low level driving control signals Sc3 and Sc5 are outputted from the control terminals C3 and C5 of the controller 22, so that the FETs of the third circuit 233 and the fifth circuit 235 are switched off. Equivalently, the first circuit 231, the second circuit 232, the fourth circuit 234 and the sixth circuit 236 configure a bridge circuit.

The driving control signals Sc1, Sc2, Sc4 and Sc6 are respectively outputted from the control terminals C1, C2, C4 and C6 of the controller 22. The phase of the driving control signal Sc1 is the same as that of the driving control signal Sc2. The phase of the driving control signal Sc4 is opposite to that of the driving control signal Sc6. The phase of the driving control signal Sc2 is opposite to that of the driving control signal Sc6. By the driving control signals Sc1 to Sc6, the slow charging circuit in positive direction $K_{2,6}$ (which is configured by the second circuit 232 and the sixth circuit 236) and the quick discharging circuit $K_{4,1}$ (which is configured by the fourth circuit 234 and the first circuit 231) are alternately connected to the piezoelectric device 10A or 10B, so that the piezoelectric device 10A or 10B is alternately charged slowly in the negative direction (or slowly expanded) and discharged quickly in the positive direction (or quickly contracted).

In the slow charge in the positive direction, the voltage Vp of the battery 19 is applied to the piezoelectric device 10A or 10B through the resistor R. The voltage Vs between the terminals of the piezoelectric device 10A or 10B exponentially varies from 0 to +Vp (V) with the time constant defined by the resistance of the resistor R and the capacitance C of the piezoelectric device 10A or 10B. On the other hand, in the quick discharge, the positive terminal of the piezoelectric device 10A or 10B is directly grounded. The voltage Vs between the terminals of the piezoelectric device 10A or 10B linearly varies from +Vp to 0 (V). Therefore, the piezoelectric device 10A or 10B alternately repeats the slow expansion and quick contraction, so that the driven member 2A or 2B is moved forward.

Similarly, as can be seen from table 1, the second circuit 232 and the sixth circuit 236 do not constitute the backward driving circuit in the first driving mode. Thus, as shown in FIG. 8, the low level driving control signals Sc2 and Sc6 are outputted from the control terminals C2 and C6 of the controller 22, so that the FETs of the second circuit 232 and the sixth circuit 236 are switched off. Equivalently, the first circuit 231, the third circuit 233, the fourth circuit 234 and the fifth circuit 235 configure a bridge circuit.

The driving control signals Sc1, Sc3, Sc4 and Sc5 are respectively outputted from the control terminals C1, C3, C4 and C5 of the controller 22. The phase of the driving control signal Sc1 is opposite to that of the driving control signal Sc3. The phase of the driving control signal Sc4 is opposite to that of the driving control signal Sc5. The phase of the driving control signal Sc3 is opposite to that of the driving control signal Sc5. By the driving control signals Sc1 to Sc6, the slow charging circuit in negative direction $K_{3,5}$ (which is configured by the third circuit 233 and the fifth circuit 235) and the quick discharging circuit $K_{4,1}$ (which is configured by the fourth circuit 234 and the first circuit 231) are alternately connected to the piezoelectric device 10A or 10B, so that the piezoelectric device 10A or 10B is alternately charged slowly in the negative direction (or slowly contracted) and discharged quickly in the positive direction (or quickly expanded).

In the slow charge in the negative direction, the voltage Vp of the battery 19 is applied to the piezoelectric device 10A or 10B through the resistor R. The voltage Vs between the terminals of the piezoelectric device 10A or 10B exponentially varies from 0 to −Vp (V) with the time constant defined by the resistance of the resistor R and the capacitance C of the piezoelectric device 10A or 10B. On the other hand, in the quick discharge, the positive terminal of the piezoelectric device 10A or 10B is directly grounded. The voltage Vs between the terminals of the piezoelectric device 10A or 10B linearly varies from −Vp to +0 (V). Therefore, the piezoelectric device 10A or 10B alternately repeats the slow expansion and quick contraction, so that the driven member 2A or 2B is moved backward.

In the second driving mode, the driving voltage applied to the piezoelectric device 10A or 10B is the voltage Vp of the battery 19. In the first driving mode, the driving voltage applied to the piezoelectric device 10A or 10B is equivalent to the voltage 2Vp. Thus, a quantity of the expansion and contraction of the piezoelectric device 10A or 10B in the first mode is larger than that in the second driving mode.

Figure 9:
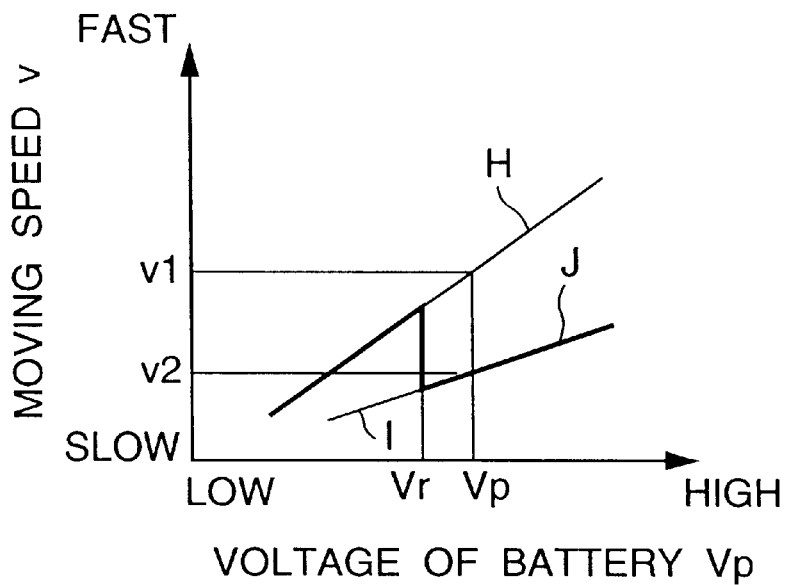
FIG. 9 is a graph for showing characteristics between moving speed of a driven member and a driving voltage in the embodiment.

In FIG. 9, a fine line designated by a symbol "H" shows the relation between the moving speed "v" of the driven member 2A or 2B and the driving voltage in the first driving mode, and a fine line designated by a symbol "I" shows the relation between the moving speed "v" of the driven member 2A or 2B and the driving voltage in the second driving mode. As can be seen from FIG. 9, the moving speed v1 of the driven member 2A or 2B in the first driving mode is faster than the moving speed v2 of the driven member 2A or 2B in the second driving mode at the same voltage Vp of the battery 19, since the equivalent driving voltage in the first driving mode is substantially double of the driving voltage in the second driving mode.

Figure 10:
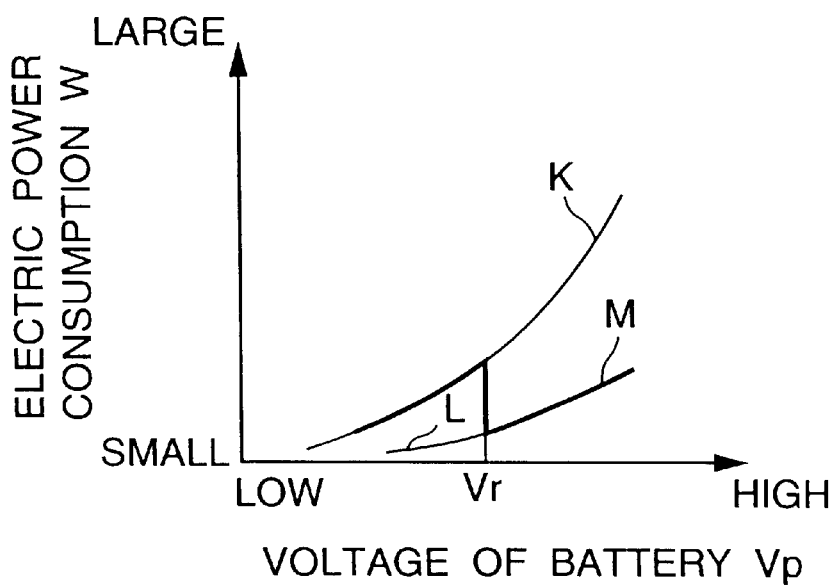
FIG. 10 is a graph for showing characteristics between electric power consumption of a battery and a driving voltage in the embodiment.

In the first driving mode, the charging current from the battery 19 always flows into the piezoelectric device 10A or 10B. In the second driving mode, the charging current intermittently flows into the piezoelectric device 10A or 10B in the charging time period designated by a symbol "A" in FIG. 8. In FIG. 10, a fine curved line designated by a symbol "K" shows a relation between the voltage Vp of the battery 19 and the electric power consumption W in the first driving mode, and a fine curved line designated by a symbol "L" shows a relation between the voltage Vp of the battery 19 and the electric power consumption W in the second driving mode. When the voltage Vp of the battery 19 is the same, the electric power consumption in the first driving mode is larger than that in the second driving mode.

In this embodiment, the piezoelectric actuator is driven in the following manner effectively for utilizing the electric power of the battery 19. When the reference voltage Vb is lower than a predetermined threshold voltage Vr (Vb<Vr), it is supposed that the drive member 2A or 2B cannot be moved at a predetermined speed. Thus, the piezoelectric actuator 8A or 8b is driven in the first driving mode for enabling the driven member 2A or 2B to move at the predetermined speed. When the reference voltage Vb is equal to or higher than the predetermined threshold voltage Vr (Vb≧Vr), it is supposed that the drive member 2A or 2B can be moved at a speed equal to or faster than the predetermined speed. Thus, the piezoelectric actuator 8A or 8B is driven in the second driving mode for saving the consumption of the electric power of the battery 19.

The controller 22 outputs the driving control signals Sc1 to Sc6 in a manner so that the moving speed of the driven member 2A or 2B follows the folded heavy line designated by a symbol "J" in FIG. 9. As can be seen from FIG. 9, the driving mode of the piezoelectric actuator 8A or 8B is switched at the threshold voltage Vr from the first driving mode to the second driving mode, and vice versa. The electric power consumption of the battery 19 will follow the folded heavy line designated by a symbol "M" in FIG. 10. By such the driving control, the life of the battery 19 can be made longer and the driven member 2A or 2B can be moved at the predetermined high speed even when the reference voltage Vb corresponding to the voltage Vp of the battery 19 is dropped below the threshold voltage Vr.

Figure 11:
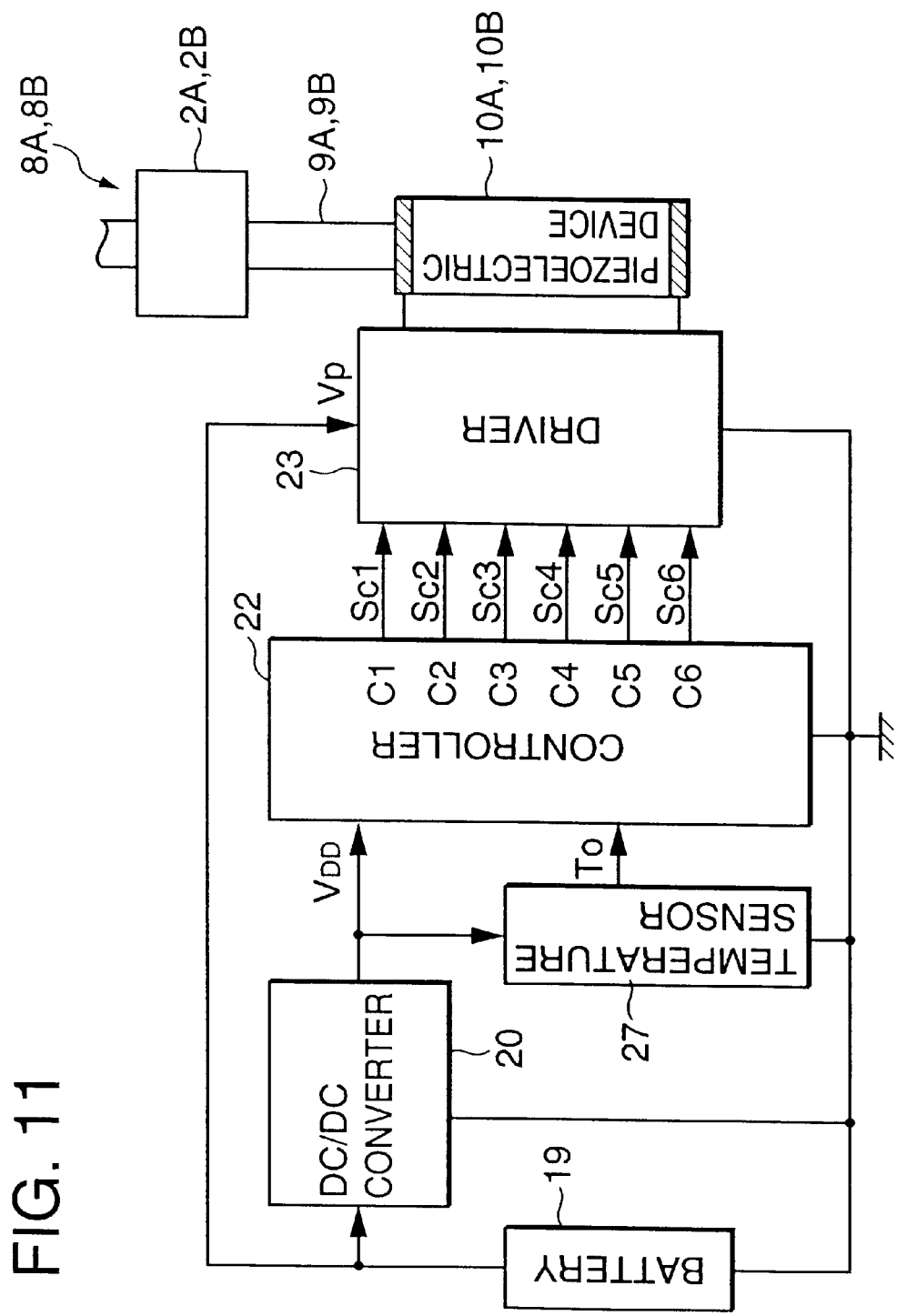
FIG. 11 is a block diagram for showing a modified configuration of the impact type piezoelectric actuator and the driving circuit thereof in the embodiment.

A first modification of the block diagram of the impact type piezoelectric actuators 8A and 8B in this embodiment is shown in FIG. 11. In the above-mentioned description, the driving mode of the piezoelectric actuator 8A or 8B is switched corresponding to the voltage of the battery 19. In the first modification, the driving mode of the piezoelectric actuator 8A or 8B is switched corresponding to an ambient temperature of an equipment using the piezoelectric actuator 8A or 8B.

As can be seen from FIG. 11, a temperature sensor 27 is provided instead of the voltage sensor 21 shown in FIG. 5. The temperature sensor 27 senses the temperature in the vicinity of the battery 19 or the piezoelectric actuator 8A or 8B. The temperature sensor 27 is configured by a series circuit of a sensing device such as a thermistor and a resistor. The ambient temperature To is sensed as a voltage at a connection point of the sensing device and the resistor. The voltage corresponding to the ambient temperature To (hereinafter, abbreviated as "temperature To") is inputted to the controller 22.

In the first modification shown in FIG. 11, the controller 22 compares the temperature To with a predetermined threshold temperature Tr corresponding to, for example, 0° C. When the temperature To is lower than the threshold temperature Tr (To<Tr), the controller 22 controls the driver 23 to be driven in the first driving mode. When the temperature To is equal to or larger than the threshold temperature Tr (To≧Tr), the controller 22 controls the driver 23 to be driven in the second driving mode.

When the ambient temperature To is lower than a threshold temperature Tr (for example, 0° C.), it is supposed that the voltage Vp of the battery 19 is decreased and the driven member 2A or 2B cannot be moved at the predetermined speed. Thus, the piezoelectric actuator 8A or 8B is driven in the first driving mode for enabling the driven member 2A or 2B to move at the predetermined speed. When the ambient temperature To is equal to or higher than the threshold temperature Tr, it is supposed that the voltage Vp of the battery 19 is higher and the driven member 2A or 2B can be moved at a speed equal to or faster than the predetermined speed, if the battery 19 is not wasted. Thus, the piezoelectric actuator 8A or 8B is driven in the second driving mode for saving the consumption of the electric power of the battery 19.

Furthermore, when the ambient temperature is lower than a ordinary temperature, the driving characteristic of the piezoelectric actuator becomes lower than that at the ordinary temperature. Thus, it is preferable to increase the driving voltage of the piezoelectric device 10A or 10B for maintaining the moving speed of the driven member 2A or 2B.

In the first modification, the controller 22 outputs the driving control signals Sc1 to Sc6 in a manner so that the moving speed of the driven member 2A or 2B follows a line similar to the folded heavy line designated by the symbol "J" in FIG. 9. The electric power consumption of the battery 19 will follow a line similar to the folded heavy line designated by the symbol "M" in FIG. 10. By such the driving control, the life of the battery 19 can be made longer and the driven member 2A or 2B can be moved at the predetermined high speed even when the voltage Vp of the battery 19 is dropped due to the drop of the ambient temperature.

In the first modification, it is possible to sense not only the ambient temperature To but also the voltage Vp of the battery 19, and the piezoelectric actuator 8A or 8B is driven by switching the first driving mode and the second driving mode corresponding to the sensing results. For example, when the ambient temperature To is lower than the threshold temperature Tr and the voltage Vp of the battery 19 or the reference voltage Vb is lower than the threshold voltage Vr, the piezoelectric actuator 8A or 8B is driven in the first driving mode.

Figure 12:
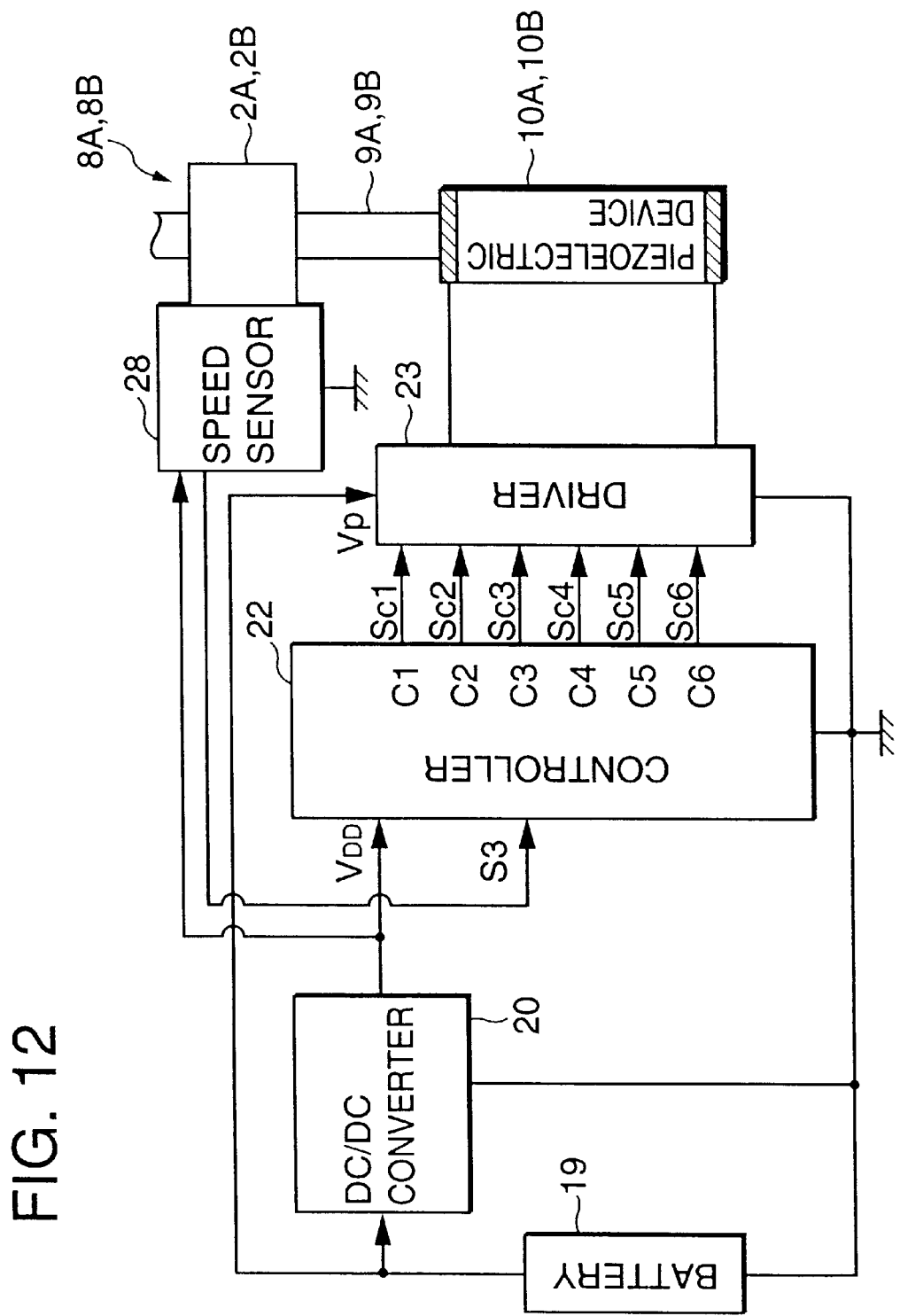
FIG. 12 is a block diagram for showing another modified configuration of the impact type piezoelectric actuator and the driving circuit thereof in the embodiment.

A second modification of the block diagram of the impact type piezoelectric actuators 8A and 8B in this embodiment is shown in FIG. 12. In the second modification, the driving mode of the piezoelectric actuator 8A or 8B is switched corresponding to a moving speed of the driven member 2A or 2B.

Figure 13:
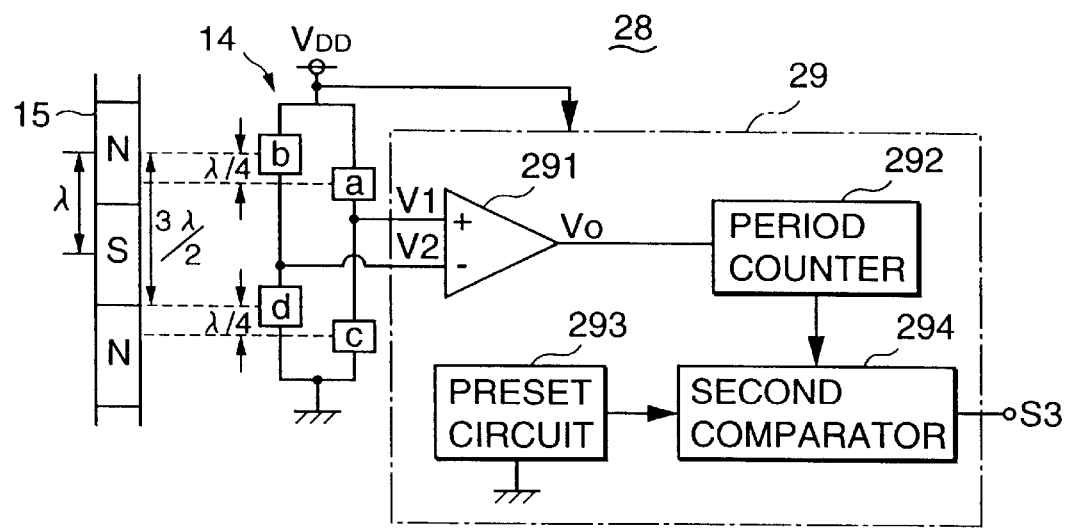
FIG. 13 a circuit diagram of a driver in the driving circuit shown in FIG. 12.
Figure 14:
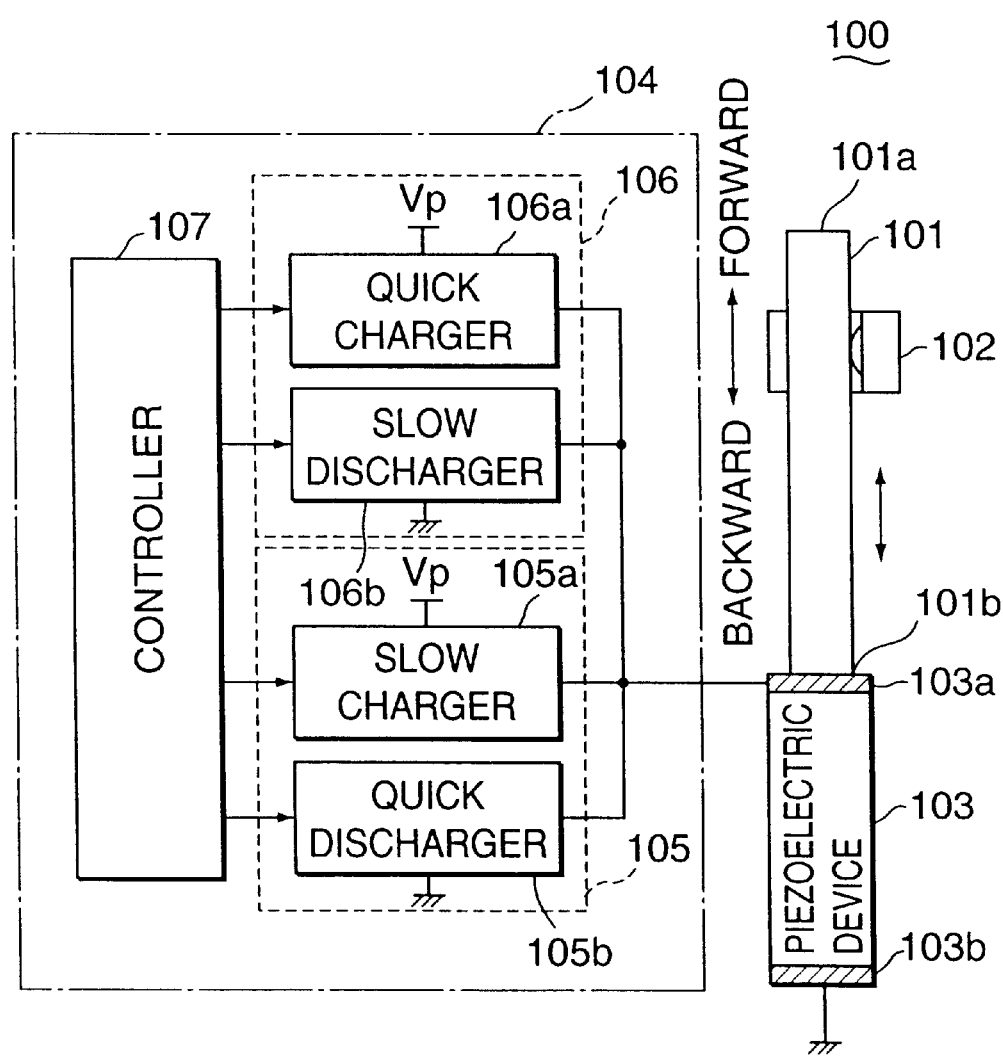
FIG. 14 is a schematic view for showing an essential configuration of a conventional impact type piezoelectric actuator with a driving circuit thereof.

As can be seen from FIG. 12, a speed sensor 28 is provided instead of the voltage sensor 21 shown in FIG. 5. The speed sensor 28 senses the moving speed of the driven member 2A or 2B. As shown in FIG. 13, the speed sensor 28 is configured by a magnetic sensor 14, a magnetic scale 15 and a speed sensing circuit 29. In comparison with FIG. 3 and FIG. 13, the signal processing circuit 16 is replaced by the speed sensing circuit 29 for judging whether the moving speed "v" of the driven member 2A or 2B is equal to or faster than a predetermined threshold speed "vr" or not.

The speed sensing circuit 29 comprises a first comparator 291, a period counter 292, a preset circuit 293 and a second comparator 294. Detection signals V1 and V2 of the magnetic sensor 14 are respectively inputted to a noninverting input terminal and an inverting input terminal of the first comparator 291.

The period counter 292 counts the time period "τ" in the output signal Vo of the first comparator 291 (see FIG. 4). The preset circuit 293 is used for setting a threshold time period "τr". The second comparator 294 compares the time period "τ" counted by the period counter 292 and the threshold time period "τr" set by the preset circuit 293, and outputs the compared result.

When the moving speed "v" of the driven member 2A or 2B is slower than the threshold speed "vr" (τ>τr), the second comparator 293 outputs a high level signal S3. When the moving speed "v" of the driven member 2A or 2B is equal to or faster than the threshold speed "vr" (τ≦τr), the second comparator 293 outputs a low level signal S3. The signal S3 is inputted to the controller 22.

In the second modification, the moving speed of the driven member 2A or 2B is directly sensed. When the driven member 2A or 2B cannot be moved at the predetermined speed in the second driving mode, the piezoelectric actuator 8A or 8B is driven in the first driving mode for enabling the driven member 2A or 2B to move at the predetermined speed. When the driven member 2A or 2B can be moved at a speed equal to or faster than the predetermined speed, the piezoelectric actuator 8A or 8B is driven in the second driving mode for saving the electric power consumption of the battery 19.

When the signal S3 is in the high level, the moving speed "v" of the driven member 2A or 2B is slower than the threshold speed "vr", so that the controller 22 controls the controller 23 to drive the piezoelectric actuator 8A or 8B in the first driving mode. Alternatively, when the signal S3 is in the low level, the moving speed "v" of the driven member 2A or 2B is equal to or faster than the threshold speed "vr", so that the controller 22 controls the controller 23 to drive the piezoelectric actuator 8A or 8B in the second driving mode.

In the second modification, the moving speed of the driven member 2A or 2B follows a line similar to the folded heavy line designated by the symbol "J" in FIG. 9. The electric power consumption of the battery 19 will follow a line similar to the folded heavy line designated by the symbol "M" in FIG. 10. By such the driving control, the life of the battery 19 can be made longer and the driven member 2A or 2B can be moved at the predetermined high speed even when the voltage Vp of the battery 19 is dropped.

When the moving speed "v" of the driven member 2A or 2B is close to the threshold speed "vr", the switching of the driving mode between the first driving mode and the second driving mode frequently occurs, and the moving speed of the driven member 2A or 2B becomes unstable. For preventing the frequent switching of the driving mode, it is preferable to provide a hysteresis in the switching level for switching the first driving mode and the second driving mode.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A driving apparatus of an impact type piezoelectric actuator for moving an object in a direction parallel to expansion and contraction of a piezoelectric device comprising:
   a first driver for driving the piezoelectric device by a first driving mode in which polarity of a driving voltage applied to the piezoelectric device is alternately switched;
   a second driver for driving the piezoelectric device by a second driving mode in which application of the driving voltage to the piezoelectric device and grounding of the piezoelectric device are alternately switched;
   an electric power supply for applying the driving voltage to the piezoelectric device;
   a driving condition sensor for sensing a driving condition with respect to a moving speed of the object;
   a discriminator for discriminating whether or not the driving condition shows the moving speed of the object equal to or faster than a predetermined speed; and
   a controller alternatively controlling the first driver, when the driving condition shows the moving speed of the object to be slower than the predetermined moving speed, and the second driver, when the driving condition shows the moving speed of the object to be equal to or faster than the predetermined moving speed.

2. A driving apparatus of an impact type piezoelectric actuator in accordance with claim 1, wherein the electric power supply is a battery.

3. A driving apparatus of an impact type piezoelectric actuator in accordance with claim 1, wherein the driving condition sensor senses an output voltage of the electric power supply, and the discriminator compares the output voltage with a predetermined threshold voltage and discriminates that the driving condition shows the moving speed of the object slower than the predetermined speed when the output voltage of the electric power supply is lower than the predetermined threshold voltage.

4. A driving apparatus of an impact type piezoelectric actuator in accordance with claim 1, wherein the driving condition sensor senses an ambient temperature, and the discriminator compares the ambient temperature with a predetermined threshold temperature and discriminates that the driving condition shows the moving speed of the object slower than the predetermined speed when the ambient temperature is lower than the predetermined threshold temperature.

5. A driving apparatus of an impact type piezoelectric actuator in accordance with claim 1, wherein the driving condition sensor senses the moving speed of the object, and the discriminator compares the moving speed of the object with a predetermined threshold speed and discriminates that the driving condition shows the moving speed of the object slower than the predetermined speed when the moving speed is slower than the predetermined threshold speed.

6. A driving method of an impact type piezoelectric actuator for moving an object in a direction parallel to expansion and contraction of a piezoelectric device comprising the steps of:
   sensing a driving condition with respect to a moving speed of the object;
   discriminating whether the driving condition shows the moving speed of the object equal to or faster than a predetermined speed or not; and
   controlling the piezoelectric device by alternative of a first driving mode in which polarity of a driving voltage applied to the piezoelectric device is alternately switched when the driving condition shows the moving speed of the object slower than a predetermined moving speed, and a second driving mode in which application of the driving voltage to the piezoelectric device and grounding of the piezoelectric device are alternately switched when the driving condition shows the moving speed of the object equal to or faster than the predetermined moving speed.

7. A driving method of an impact type piezoelectric actuator in accordance with claim 6, wherein an output voltage of a battery applied to the piezoelectric device is sensed and compared with a predetermined threshold voltage; and the driving condition is discriminated to show the moving speed of the object slower than the predetermined speed when the output voltage of the electric power supply is lower than the predetermined threshold voltage.

8. A driving method of an impact type piezoelectric actuator in accordance with claim 6, wherein an ambient temperature is sensed and compared with a predetermined threshold temperature; and the driving condition is discriminated to show the moving speed of the object slower than the predetermined speed when the ambient temperature is lower than the predetermined threshold temperature.

9. A driving method of an impact type piezoelectric actuator in accordance with claim 6, wherein the moving speed of the object is sensed and compared with a predetermined threshold speed; and the driving condition is discriminated to show the moving speed of the object slower than the predetermined speed when the moving speed is slower than the predetermined threshold speed.

10. A driving apparatus comprising:
    a piezoelectric actuator for moving an object in a direction that is parallel to an expansion and contraction direction of a piezoelectric element;
    a power supply for supplying a drive voltage to the piezoelectric element;
    a first driver for driving the piezoelectric element by applying the drive voltage to the piezoelectric element by a first driving mode in which a polarity of the drive voltage is alternately switched;
    a second driver for driving the piezoelectric element by applying the drive voltage to the piezoelectric element by a second driving mode in which application of the drive voltage to the piezoelectric element and grounding of the piezoelectric element are alternately switched;
    a driving condition sensor for sensing a driving condition of the object; and
    a controller for controlling at least one of the first driver and the second driver based on the thus sensed driving condition of the object.

11. A driving apparatus as claimed in claim 1 wherein the sensed driving condition is a speed of the object.

* * * * *